United States Patent
Lauer et al.

(10) Patent No.: US 6,421,057 B1
(45) Date of Patent: Jul. 16, 2002

(54) CONFIGURABLE VOLUME RENDERING PIPELINE

(75) Inventors: Hugh C. Lauer, Concord; Larry D. Seiler, Boylston; James M. Knittel, Groton; Kenneth W. Correll, Lancaster; Charidimos E. Gasparakis, Acton; Vikram Simha, Lexington; Vishal C. Bhatia, Arlington, all of MA (US)

(73) Assignee: Terarecon, Inc., San Mateo, CA (US)

( * ) Notice: Subject to any disclaimer, the term of this patent is extended or adjusted under 35 U.S.C. 154(b) by 0 days.

(21) Appl. No.: 09/353,679

(22) Filed: Jul. 15, 1999

(51) Int. Cl.[7] .............................. G06T 1/20; G06T 17/00
(52) U.S. Cl. ........................................ 345/506; 345/424
(58) Field of Search .................................. 345/501, 506, 345/530, 545, 424, 419, 420, 423, 418, 426

(56) References Cited

U.S. PATENT DOCUMENTS

| | | | | |
|---|---|---|---|---|
| 4,835,712 A | * | 5/1989 | Drebin et al. ............... 345/423 |
| 5,313,567 A | * | 5/1994 | Civanlar et al. ............ 345/419 |
| 5,630,034 A | * | 5/1997 | Oikawa et al. .............. 345/424 |
| 5,831,623 A | * | 11/1998 | Negishi et al. .............. 345/424 |
| 5,956,041 A | * | 9/1999 | Koyamada et al. ......... 345/420 |
| 5,963,211 A | * | 10/1999 | Oikawa et al. .............. 345/424 |
| 5,986,662 A | * | 11/1999 | Argiro et al. ................ 345/419 |
| 6,008,813 A | * | 12/1999 | Lauer et al. ................. 345/418 |
| 6,211,884 B1 | * | 4/2001 | Knittel et al. ................ 345/419 |
| 6,266,733 B1 | * | 7/2001 | Knittel et al. ................ 345/424 |
| 6,297,799 B1 | * | 10/2001 | Knittel et al. ................ 345/419 |
| 6,310,620 B1 | * | 10/2001 | Lauer et al. ................. 345/424 |
| 6,313,841 B1 | * | 11/2001 | Ogata et al. ................. 345/424 |
| 6,342,885 B1 | * | 1/2002 | Knittel et al. ................ 345/424 |

* cited by examiner

*Primary Examiner*—Kee M. Tung
(74) *Attorney, Agent, or Firm*—Dirk Brinkman

(57) ABSTRACT

A volume rendering pipeline includes a plurality of processing stages such as a gradient estimation stage, an interpolation stage, a classification stage, an illumination stage, and a compositing stage. The stages are connected to each other by multiplexers. A first multiplexer connects an output of a first stage to an input of a second stage. A second multiplexer connects an output of the second stage to an input of the first stage. A third multiplexer has inputs connected to the output of the first stage and the output of the second stage, the first, second, and third multiplexers are responsive to a select signal to configure the stages of the rendering pipeline for processing the volume data set.

13 Claims, 9 Drawing Sheets

| VoxelFormat Register | |
|---|---|
| Field Name | Description |
| Field4 | Descriptor of Field 4 |
| Field3 | Descriptor of Field 3 |
| Field2 | Descriptor of Field 2 |
| Field1 | Descriptor of Field 1 |
| Field0 | Descriptor of Field 0 |

CONFIGURABLE VOLUME RENDERING PIPELINE

FIELD OF THE INVENTION

This invention relates generally to volume rendering, and more particularly, to a rendering pipeline wherein the order of processing in the pipeline stages can be user selectable.

BACKGROUND OF THE INVENTION

Introduction to Volume Rendering

Volume rendering is often used in computer graphics applications where three-dimensional data need to be visualized. The volume data can be scans of physical or medical objects, or atmospheric, geophysical, or other scientific models where visualization of the data facilitates an understanding of the underlying real-world structures represented by the data.

With volume rendering, the internal structure, as well as the external surface features of physical objects and models are visualized. Voxels are usually the fundamental data items used in volume rendering. A voxel is a data item that represents a particular three-dimensional portion of the object or model. The coordinates (x, y, z) of each voxel map the voxels to positions within the represented object or model.

A voxel represents some particular intensity value of the object or model. For a given prior art volume, intensity values can be a specific one of a number of different parameters, such as, density, tissue type, elasticity, or velocity. During rendering, the voxel values are converted to color and opacity (RGBα) values, according to the intensity values, which can be projected onto a two-dimensional image plane for viewing.

One frequently used technique during rendering is ray-casting. A set of imaginary rays are cast through the array of voxels. The rays originate from a viewer's eye or from an image plane. The voxel values are re-sampled to points along the rays, and various techniques are known to convert the sampled values to pixel values. Alternatively, voxel values may be converted directly to RGBα voxels, which are then re-sampled along rays and accumulated to pixel values. In either case, processing of the volume data may proceed back-to-front, or front-to-back.

Rendering Pipeline

Volume rendering can be done by software or hardware. In one hardware implementation, the hardware is arranged as a multi-stage pipeline, see U.S. patent application Ser. No. 09/190,643 "Fast Storage and Retrieval of Intermediate Values in a Real-Time Volume Rendering System," filed by Kappler et al. on Nov. 12, 1998.

FIG. 1 illustrates a pipeline 100 wherein voxel values are stored in a voxel memory 101. The voxel values are first read into a voxel buffer 110 of the pipeline as slices. The z-components of the gradients are estimated in stage 115 by taking central differences between voxels of different slices. Then, both the voxel values and the z-gradients are passed to an interpolation stage 120 that calculates these values at sample points along rays. Next, the x- and y-components of the gradients are calculated from the interpolated sample values in stage 130. These, along with the sample values and the interpolated z-gradients are then passed to a classification stage 140, and then a shading stage 145, where an illumination process is applied to produce the RGBα values representing the illuminated samples. Finally, the illuminated samples are combined along rays in an compositing stage 150 to produce pixel values for the base plane stored in a pixel memory 109.

That pipeline structure suffers because the order of processing data is fixed by the arrangement of the various stages. Also, voxel values are interpolated so that only interpolated samples can be classified. It is not possible to concurrently render multiple volumes acquired from different scanning modalities. In addition, the format of the voxel data is fixed. Gradient fields are obtained from the fixed format voxel data. It is desired to improve on this prior art pipeline.

SUMMARY OF THE INVENTION

The invention provides a volume rendering pipeline including a plurality of processing stages. The stages can include a gradient estimation stage, an interpolation stage, a classification stage, an illumination stage, and a compositing stage. The stages are connected to each other by multiplexers.

A first multiplexer connects an output of a particular stage to an input of another stage, and a second multiplexer connects an input of a particular stage to an output of another stage. The multiplexers selectively connect the stages of the pipeline in a predetermined order to configure the rendering pipeline for processing a volume data set.

In one aspect of the invention, voxels of the volume data set are interpolated before classified, and in another aspect, the voxel are interpolated before they are classified.

BRIEF DESCRIPTION OF THE DRAWINGS

FIG. 7 is a block diagram of a voxel format register;

DETAILED DESCRIPTION OF PREFERRED EMBODIMENTS

Figure 1:
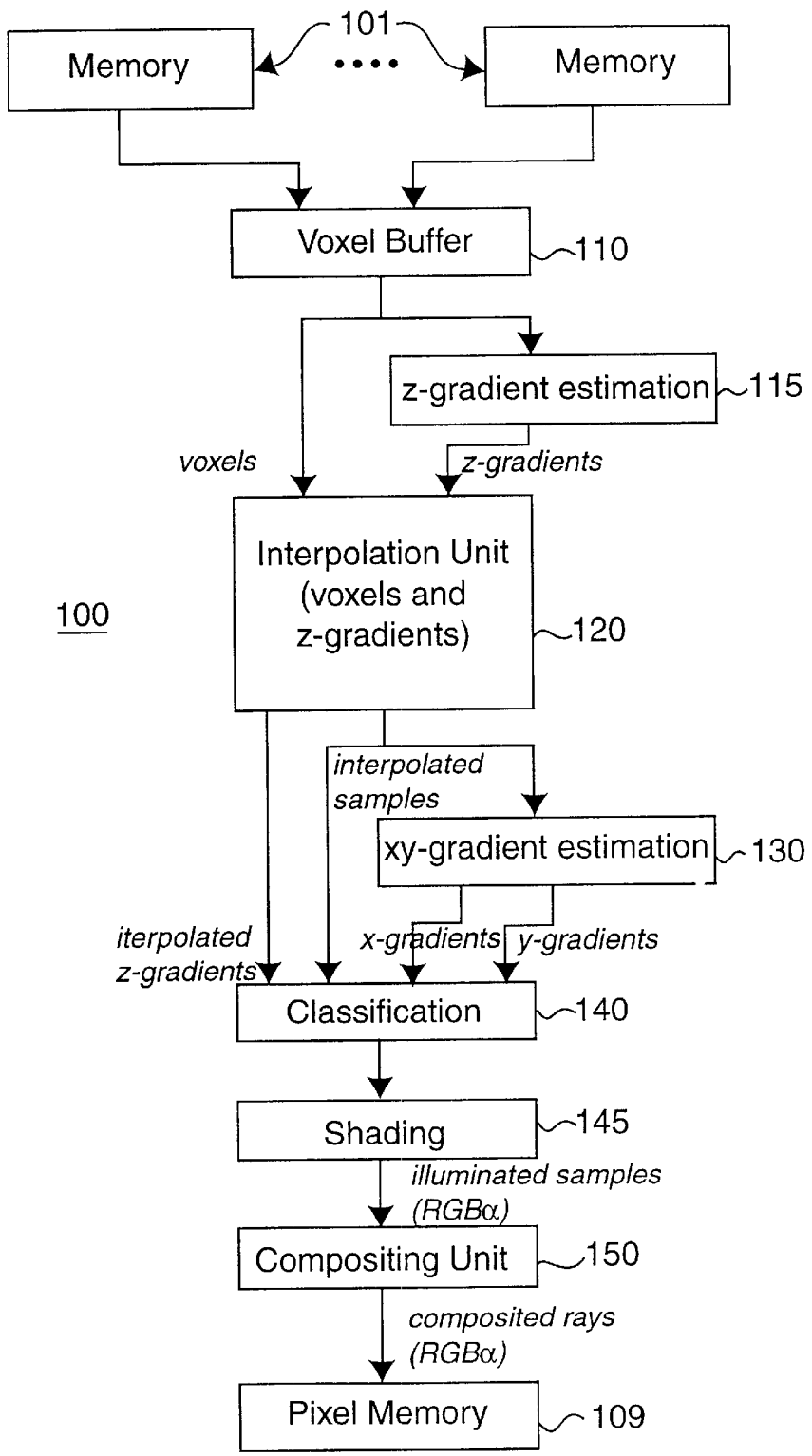
FIG. 1 is a block diagram of a prior art rendering pipeline.
Figure 2:
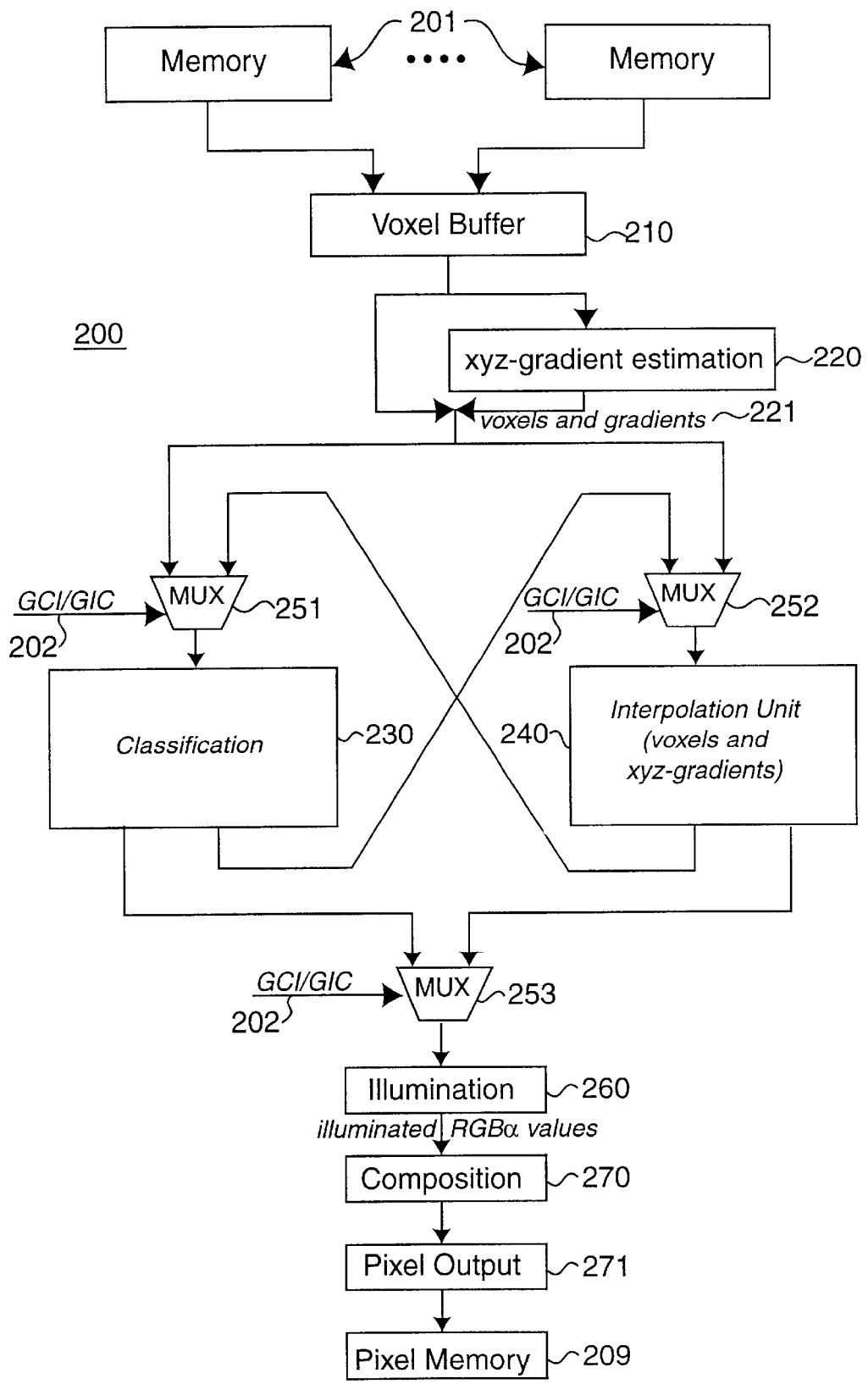
FIG. 2 is a block diagram of a configurable rendering pipeline.

FIG. 2 shows a top-level block diagram of a configurable rendering pipeline 200 according to the invention. The pipeline 200 takes samples or voxels as input from a voxel memory 201, and stores pixels as output in a pixel memory 209. The voxels or samples are read into a voxel buffer 210 a volume slice at the time. Gradients are estimated for xyz-components in stage 220. Here, in contrast with the prior art, all gradient components are estimated on voxel or sample values, not on interpolated samples.

The voxels 221 are classified in stage 230. Interpolation of voxels and gradients takes place in stage 240. Gradient estimation and interpolation are linear operations and therefore can be interchanged. As an advantage of the invention, the application can determine the order in which the voxels and gradients are processed by the various stages. The reason for two different processing orders is a follows.

Scanners acquire sampled data by making physical measurements which typically represent an integral over a small region of space. Adjacent voxels often represent the integrals of overlapping regions. In these cases, it is more accurate to interpolate voxels first, then classify the result. In particular, a voxel at a boundary of, say, two different tissues is likely to represent an average of the physical properties of each tissue. When interpolating, all that is done is moving the points of average. To make this useful, the classification function should present a continuous transition from between the colors and opacities assigned to the two tissue types.

Sometimes, sampled data may be pre-segmented (manually or automatically) into distinct materials, e.g., bone, muscle, cartilage, etc. Given such data, it would be inappropriate to interpolate between two differently identified tissues to obtain a third tissue that is not really there. In these cases, it is better to classify the voxels first, then interpolate the resulting colors. This is not so much an average of the physical properties of adjacent tissue types, but rather a blend of the colors at their boundaries.

Therefore, the pipeline 200 includes a multiplexer 251 connecting the output from stage 240 to the input of stage 230. Similarly, a multiplexer 252 connects the output of stage 230 to the input of stage 240. Multiplexer 253 selects the output from either stage 230 or stage 240.

The order of connection of the stages depends on a selection signal (GCI/GIC) 202 to the three multiplexers 251–253. In either case, interpolated gradients and interpolated samples are passed to the illumination stage 260. Illuminated RGBα values are composited in stage 270, and output pixels 271 are stored in the pixel memory 209.

In the pipeline 200, the output of the gradient estimate stage 220 is the three components of gradients. These are passed to both the classification stage and the interpolation stage through the set of multiplexers. The output of each of these stages is each passed to the input of the other stage and also to the illumination stage 260 through another multiplexer.

By appropriately selecting the three multiplexers 251–253, it is possible to do classification before interpolation, or interpolation before classification, or only interpolation, or only classification. These different modes of operation is now described in greater detail.

GIC—Gradient, Interpolation, Classification

Figure 3:
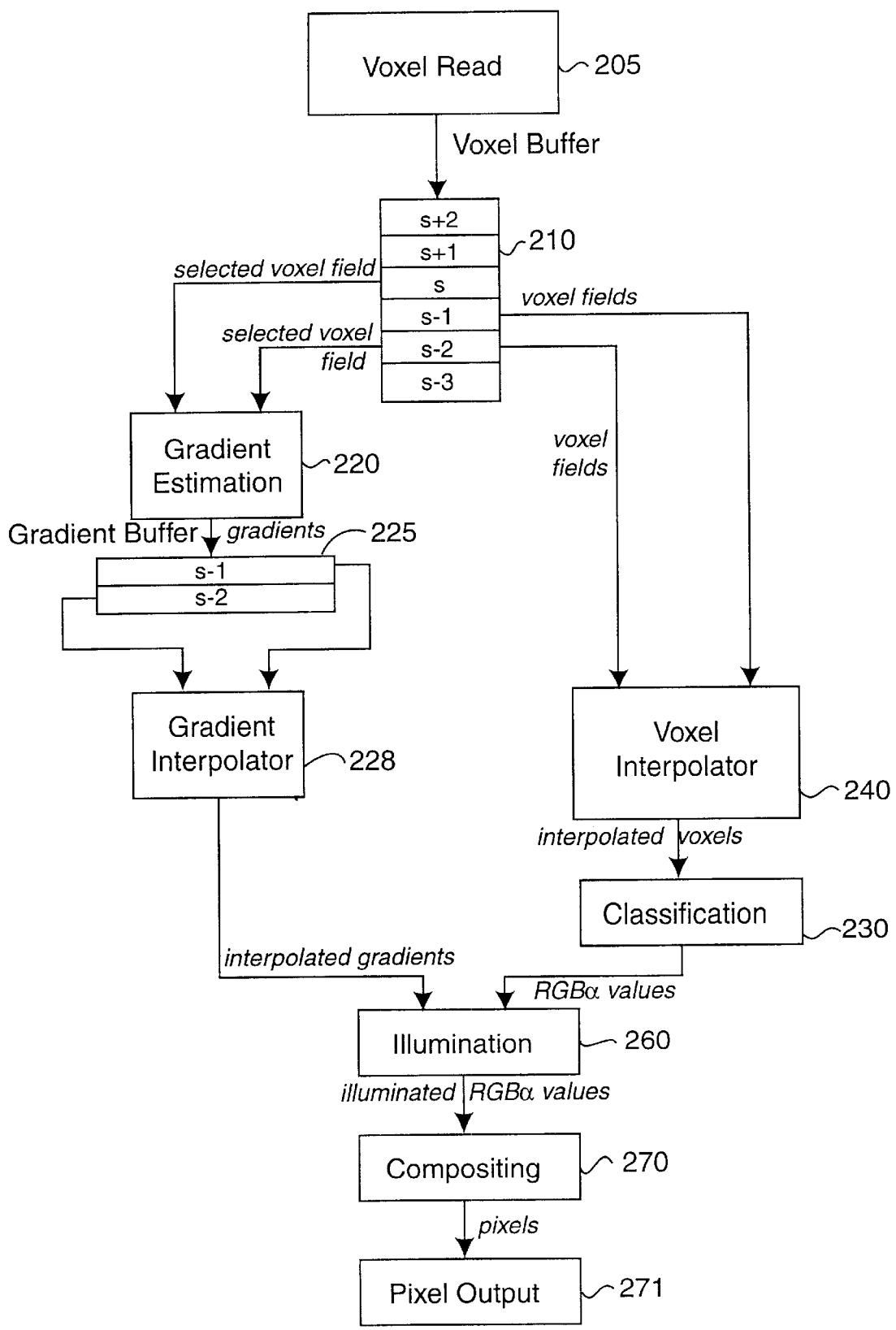
FIG. 3 is a pipeline with interpolation before classification.

FIG. 3 illustrates the rendering process for the GIC mode. This mode can be selected by signal 202. In the GIC mode, gradients are first estimated, then interpolation takes place on gradients and voxels in parallel, followed by classification of the voxels.

Rendering proceeds a section at a time, that is, in groups of 32×32 rays. In order to process a section of rays, slices of voxels are read into the voxel buffer 210 two slices at the time. Each slice has only the voxels needed for that section. The number of voxels per slice depends upon the view direction and resampling frequency. The maximum number of voxels needed is 37×37 voxels.

Reading voxels into the voxel buffer 210 can consumes the full bandwidth of the destination slices. Therefore, at any given time, one pair of slices is dedicated to receiving new voxels, while another two pairs of slices are dedicated to supplying the next stages of the pipeline, i.e., the gradient estimation 220 and the voxel interpolation stages 240.

In FIG. 3, slices labeled s+1 and s+2 are receiving new voxels, while slices s, s−1, and s−2 are providing voxels to the subsequent stages. Slice s−3 was used during a previous slice and is currently empty. When the processing of slice s−2 is complete, slice s−2 is also marked as empty. Then, slices s−2 and s−3 will become the new destination for voxel reads, while the processing modules will start taking their input from slices s+1, s, and s−1.

The gradient estimation stage 220 estimates gradients at voxel points in slice s−1 from voxel values in slices s and s−2. These gradients are then stored in a two slice gradient buffer 225 for interpolation by unit 228. Gradients for voxel points in slice s−2 had been stored in the gradient buffer during a previous slice iteration.

Next, voxel interpolation 240 and gradient interpolation 228 proceed concurrently. That is, a slice of samples is obtained by interpolating voxel values from voxel slices s−1 and s−2. Gradients at a sample points in the current slice of samples are obtained by interpolating the gradients of gradient slice s−1 and gradient slice s−2 in the gradient buffer. More than one slice of samples and interpolated gradients can be obtained from the same pair of voxel and gradient slices.

The interpolated voxel values are next applied to the classification stage 230, which converts the values to interpolated RGBα color values. The RGBα values and the gradients are next supplied to the illumination stage 260, and finally to the compositing stage 270.

In an optional mode, gradients are extracted directly from, for example, three voxel fields, instead of using the gradient estimation stage 220 to estimating gradients from any voxel field.

GCI—Gradient, Classification, Interpolation

Figure 4:
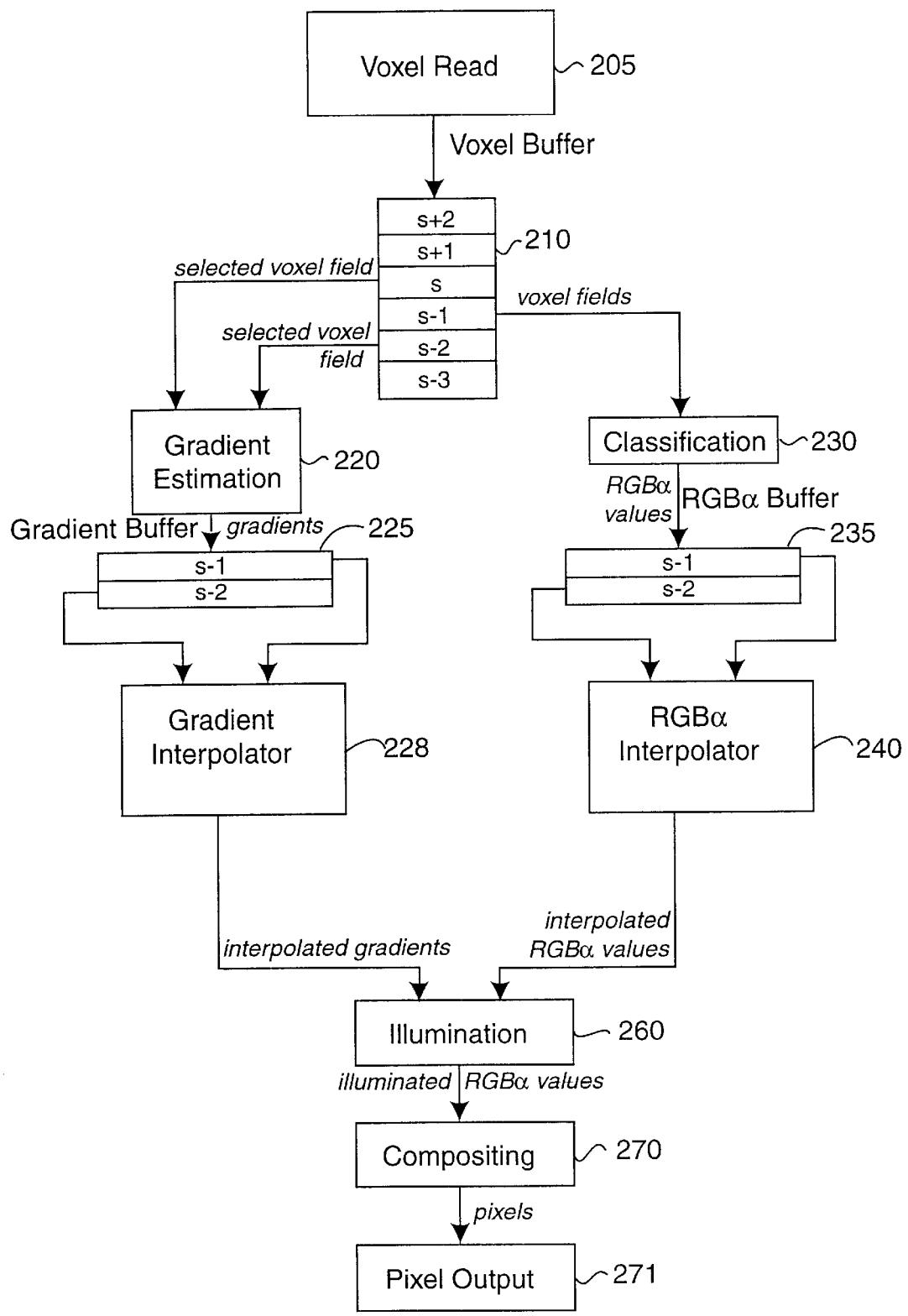
FIG. 4 is a pipeline with classification before interpolation.

FIG. 4 illustrates the rendering algorithm for the GCI mode, also selected by signal 202. The voxel buffer 210 is filled as described above, and the gradient estimation process is also the same. The difference is in the voxel classification and interpolation side. In particular, raw voxels are taken from the voxel slice buffer, that is slice s−1, and immediately converted to RGBα values by the classification stage 230. These are then stored in a two slice RGBα buffer 235. Note, the RGBα buffer 235 is parallel to the two slice gradient buffer 225.

The two slices are then input to the RGBα interpolation stage 240, where interpolated RGBα values are produced in parallel with interpolating gradients. These are then applied with interpolated gradients to the illumination and compositing stages to produce the pixel output 271 of the base plane image. These last two modules are identical to those of FIG. 2–3.

One additional optional mode is also possible. In this optional mode, multiple, for example, four, fields of the voxel are interpreted as raw RGBα values. In this case, the gradient may be estimated from the alpha (α) field.

It should be noted that for some volume data sets and rendering modes it may be best to estimate gradient in a later stage of the pipeline, for example, after classification.

It should be apparent that the multiplexers 251–253 can be replicated for other stages. Stages can selected and connected in a number of different orders to provide a reconfigurable rendering pipeline. Some stages can be de-selected to not process the volume data at all, for example, for some renderings gradient estimation and illumination may be skipped.

Flexible Voxel Format

Figure 5:
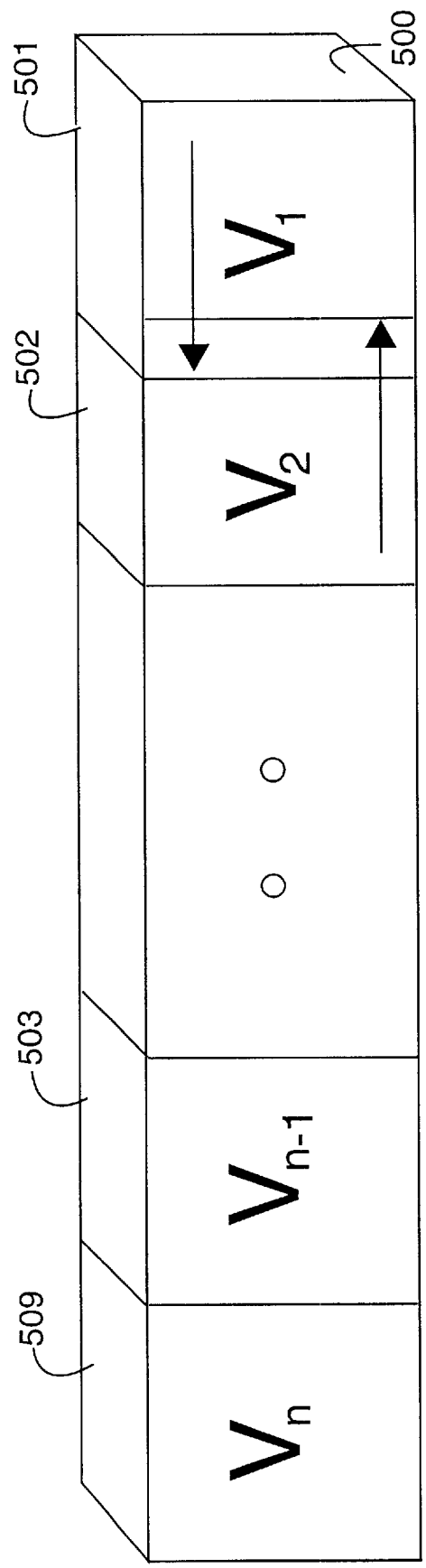
FIG. 5 is a block diagram of a flexible format voxel.

As shown in FIG. 5, a voxel 500 as used by the configurable rendering pipeline 200 includes a plurality of fields $(V_1, \ldots, V_n)$ 501–209. Each of the fields 501–209 can be specified as an offset and width in the voxel 500. Any of the fields can overlap as shown for fields $V_1$ and $V_2$. The fields can be enumerated in any order.

The fields describe different attributes of a represented three-dimensional object or model. For example, if the object is a human head, then the fields 501–209 can respectively store intensity values acquired from CT, MRI, PET, SPECT, and ultrasound scans. i.e., each voxel may store five different scan intensity values in a single volume representation. Alternatively, the scans can be stored as multiple separate volumes wherein each voxel contributes one field.

Some fields can be category fields related to the way the volume is segmented, e.g., manual, semi-automatic, or automatic segmentation. In medical applications, segmentation can categorize bone, tissue, etc., In physical applications, segmentation can identify sub-assemblies or other parts to be rendered in a particular way. For physical models, the fields can store state variables used in scientific visualization, e.g., pressure, velocity, angular momentum, elasticity, density, temperature, and viscosity. For any volume data set, the fields can also store RGBα values, depth, 3D stencil, shadows, fog, voxelized and embedded geometry volumes, or gradients.

For a multi-field voxel 500 according to our invention, the user can specify which fields to use for gradient calculations. For each component of the gradient, we can specify which of the voxel fields to use for that component.

For multi-field visualization, it is usually desirable to interpolate fields within voxels separately. Furthermore, each field within the voxel can have a different interpolation function applied, e.g., tri-linear for intensity fields, and nearest neighbor interpolation for category fields. The flexible voxels as described herein enable a common framework for treating all special cases of voxel formats in a uniform fashion.

Field Format Register

Figure 6:
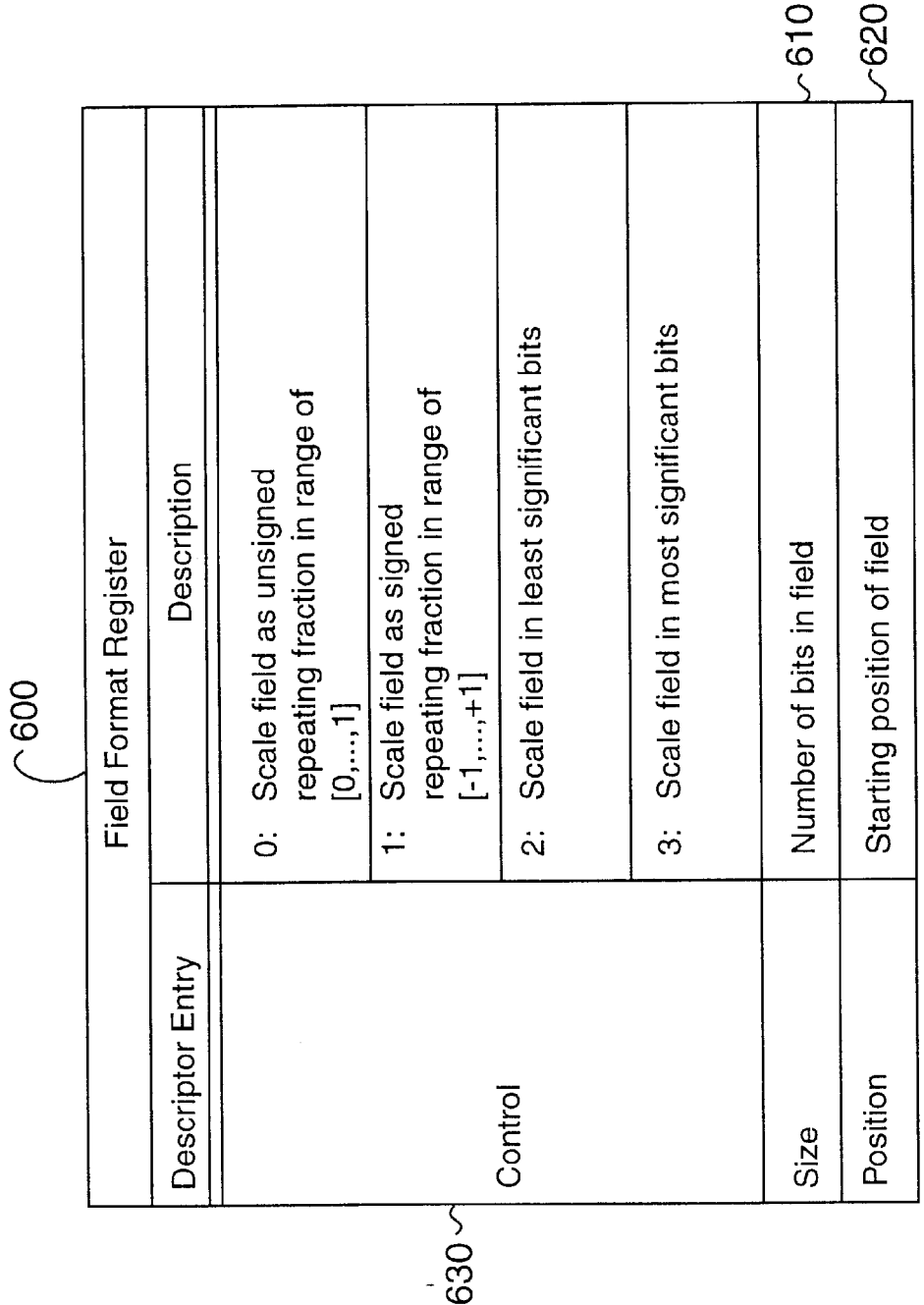
FIG. 6 is a block diagram of a field format register.

FIG. 6 shows a field format register 600 that enables multiple field voxels according to the invention. In one embodiment, fields of voxels are defined by descriptors of the field format register. This is an 8-bit (7:0) descriptor defining the size of the field (in 4-bit nibbles) 610, the position of the field within its voxel 620, pixel (also in 4-bit nibbles), and what to do (control 630) when the field is a different size than specified for its intended use.

The control bits define how a field may adapted to fit the data path of the pipeline through which the field will pass. The field can be changed by repeating fraction arithmetic, or by adding or removing bits from either the most significant or least significant end.

Control=0: the field of the raw voxel is treated as an unsigned repeating fraction representing a number in the range [0 . . . 1]. To expand or shrink the repeating fraction to fit the data path, repeating fractional arithmetic is applied to scale and round, thereby representing the number with fewer or more bits of precession. Repeating fraction number representation is described in greater detail below.

Control=1: the field of the voxel is treated as a signed repeating fraction in the range [−1 . . . +1].

Control=2: the field of the raw voxel is expanded or truncated in its least significant bits to fit the data path. The most significant bits are preserved.

Control=3: the field of the raw voxel is expanded or truncated in its most significant bits to fit the data path. The least significant bits are preserved.

Repeating Fraction Number Representation

Many graphics applications use a fixed width binary number to represent color, transparency, or other parameters that have values in the range zero to one, inclusive.

Let R be the number of bits in the binary number and let V be the unsigned binary value stored in these bits. Then $F=V/(2^R-1)$ is a rational number in the range [0 . . . 1]. That is, when V equals zero, F equals zero, and when V equals its largest possible value, $(2^R-1)$, F equals one. This representation is well known in the prior art. For example, the OpenGL Specification refers to it as a special kind of fixed point representation.

To clearly distinguish the representation described herein from ordinary fixed point representation, the term "repeating fractions" is used. The name term derives from the fact that expanding F into a fixed point binary fraction produces 0.VVVVVV . . . , that is, a binary fraction that repeats the R-bit value V infinitely to the right of the binary point.

Repeating fractions can be represented with more than R bits and can even be signed. In that case, R is the "repeating precision" of the number, since R defines the implicit scale factor $(2^R-1)$. This allows F to have values outside the range [0 . . . 1]. In this case, the binary fixed point representation consists of an integer value followed by an R-bit infinitely repeating binary value. Repeating fractions with the same precision may be added and subtracted in the same way as ordinary integers.

Other arithmetic operations, including changing the repeating precision, may be performed by first computing F for each repeating fraction, performing normal arithmetic, and then multiplying the resulting value by $(2^R-1)$ for the repeating precision R of the result. More efficient forms exist for operations on repeating fractions. For example, doubling the repeating precision from R to 2R simply requires computing V+(V<<R).

Voxel Formats

The pipeline according to the invention allows a wide range of input formats of voxels. Input voxels can be 8, 16, 32, or larger bit quantities. Fields can be 4, 8, 12, or 16 bits in width, and are aligned on a 4-bit boundary within the voxel. All voxels fields are scaled to fit their data paths, which are typically twelve bits wide.

Figure 8:
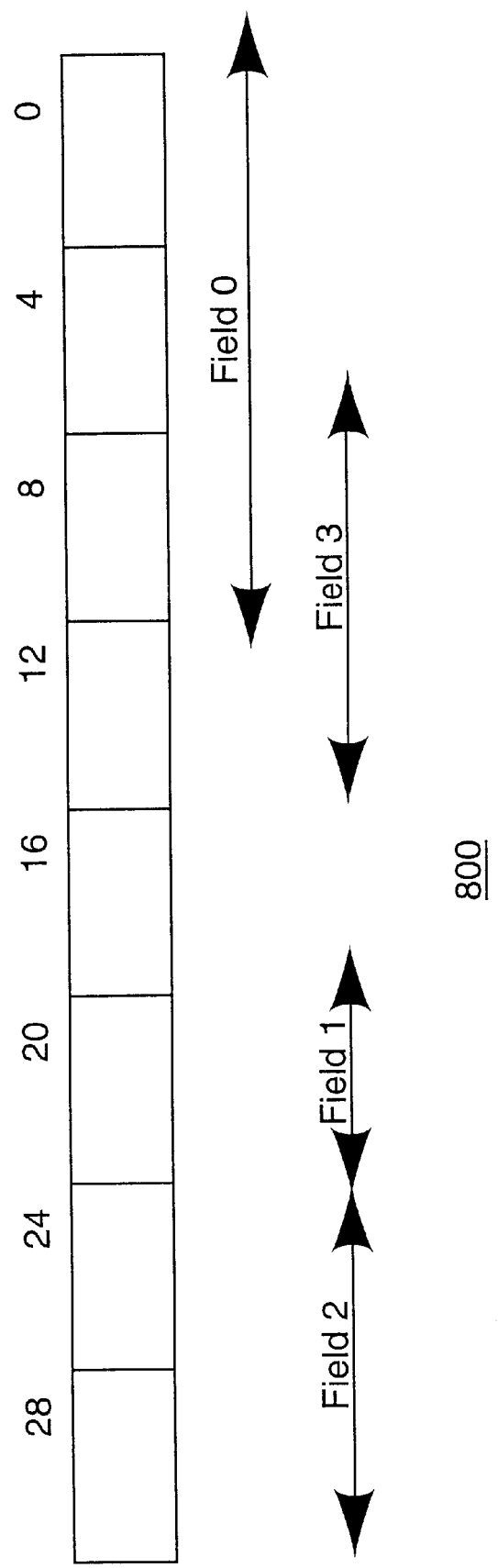
FIG. 8 is an example formatted voxel.

The format of a voxel is described in a voxel format register 700. An example of the format of a 32-bit voxel 800 is illustrated in FIG. 8. In FIG. 7, the format register for the example voxel, Field0 occupies bits 11:0, Field1 occupies bits 23:20, Field2 occupies bits 31:24, and Field3 overlaps Field0 and occupies bits 15:8. For the example shown in FIG. 8, the descriptions of the fields in field format register are as follows:

Field3: Size=1 Position=2,
Field2: Size=1 Position=6,
Field1: Size=0 Position=5, and
Field0: Size=2 Position=0.

Advantages

Having flexible format voxels, and a reconfigurable pipeline enable a number of advantages. For example, one of the fields in a voxel can be used for category bits. These are extra bits in voxels that identify the voxel as part of some particular tissue, sub-assembly, or other partition of the volume. They are not interpolated, but they do contribute to the assignment of RGBα values to voxels. When category bits are used, classification usually precedes interpolation.

The flexible voxel format allows gradients to be estimated from any selected field of the voxel. In these cases, a convolution kernel, such as a central difference, is applied to the selected field of each voxel to obtain the x, y, and z-components of the gradient of that voxel. These gradients are then interpolated, in parallel with raw or classified voxels, in order to obtain gradients at sample points. These are then applied, along with RGBα values to the illumination stage 260, and finally to the compositing stage 270.

In some applications and for some volumes, it may be better to use gradients that are determined in some other manner, instead of estimating them from the fields of voxels on the fly. Flexible format voxels accommodate this mode. In particular, gradients may be precomputed for the voxels with a high level of precision. These precomputed gradients can be stored in one of the fields of the voxels. These precomputed gradients can bypass the estimation stage, but are interpolated and applied in the illumination stage 260 just as the gradients estimated on the fly.

In a further variation, precomputed gradient are applied to a convolution kernel for gradient estimation. This has the effect of taking the second partial derivative of the volume data set. By the same technique, higher order partial derivatives may be obtained. Such derivatives are useful for extracting weak surfaces in the volume data set. As described for FIG. 9 below, this can be done by passing the volume data set through the pipeline (1–3) multiple times in a "multi-pass" operation. Each pass processing the volume data set with different set of rendering parameters.

The pipeline 200 processing flexible format voxels also admits volume data sets that are preclassified and presented as "RGBα" voxels. Two alternatives are useful. In one, gradient estimation and the classification and shading can be skipped entirely, and the voxels simply interpolated. In the other alternative, gradients are estimated from alpha values or a luminance function, and shading the RGBα values is done according to the illumination function. Note, the pipeline 200 according to the invention is also capable of interpolating both voxel-gradient values and RGBα values.

Multi-pass Volume Rendering

Figure 9:
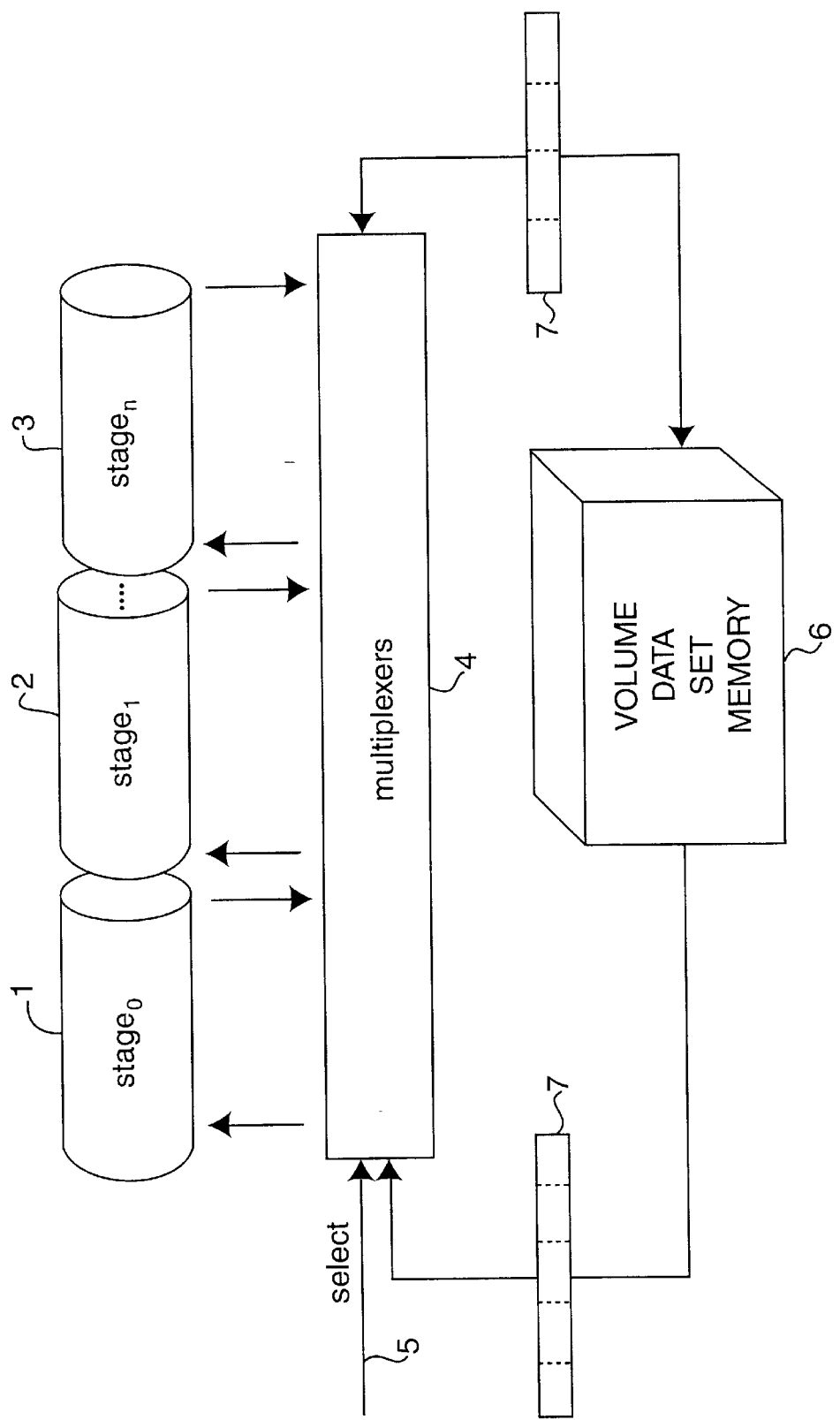
FIG. 9 is a block diagram of a configurable rendering pipeline connected to a volume memory.

The rendering pipeline 200 can also write out a volume data set that has passed through some, but not necessarily all, of the stages of the pipeline 200 back to the voxel memory, see FIG. 9. In an example use, the configured pipeline renders a set of voxels into RGBα values. Instead of composited along rays, the RGBα values are stored back to the memory 201 as RGBα voxels in a three-dimensional voxel array. Then, the volume is rerendered with a different set of rendering parameters. This process can repeat until a final volume is present in memory 201. The final accumulated values are then rendered one final time to generate an image in the pixel memory 209.

This technique enables a number of features, such as fast resampling. With fast resampling, the volume data set can be resampled to a different resolution using the speed and power of the volume rendering pipeline and volume memory, instead of relying upon the host processor and software.

Multi-pass rendering can be used to produce complex shadows on the volume. One pass is needed for each light source. Each pass is accumulated in the output volume data set, and then a final pass interpolates the results and projects them onto the base plane. In multi-pass rendering, the volume data set output from a current pass is combined with an already existing volume data set in the memory. This sometimes requires a read-modifywrite operation rather than a simply write operation.

Multi-Channel Rendering

The pipeline 200 can also process multi-channel data sets. Some scanning techniques, such as, ultrasound and seismic applications, have data of more than one type, each with its own classification. During rendering these data sets are be superimposed on each other, and combined, voxel-by-voxel.

More particularly, the compositing stage 270 is able to operate in either of two modes. In a first mode, the RGBα values are combined with previously stored pixel values, and in a second mode, a ray of RGBα values is accumulated, and the result is combined with a previously stored pixel value from some previous pass.

Pipeline General Structure

Generally, the relation of the pipeline 200 and the memory 201 can be as shown in FIG. 9. Here, the stages (stage$_0$, stage$_1$, . . . , stage$_n$) 1–3 of the pipeline 200 are connected to each other by multiplexers 4 so that for a particular rendering application, the stages are ordered by a select signal 5. The input to the pipeline is a raw volume data set stored in a memory 6. The output of the pipeline is a modified volume data set. Individual data items of the volume data set passed between the pipeline and the memory are flexible format voxels 7. The volume data set can be processed by multiple passes.

It is to be understood that various other adaptations and modifications may be made within the spirit and scope of the invention. Therefore, it is the object of the appended claims to cover all such variations and modifications as come within the true spirit and scope of the invention.

We claim:

1. A volume rendering pipeline including a plurality of stages for rendering a volume data set, comprising:
    a first multiplexer connecting an output of a first stage to an input of a second stage;
    a second multiplexer connecting an output of the second stage to an input of the first stage;
    a third multiplexer having inputs connected to the output of the first stage and the output of the second stage, the first, second, and third multiplexers responsive to a select signal for selecting an order of processing of the volume data set through the first and second stages.

2. The pipeline of claim 1 wherein the plurality of stages includes a gradient estimation stage, interpolation stage, classification stage, illumination stage, and compositing stage.

3. The pipeline of claim 2 wherein the select signal connects the interpolation stage before the classification stage.

4. The pipeline of claim 2 wherein the select signal connects the classification stage before the interpolation stage.

5. The pipeline of claim 2 wherein the gradient estimation stage extracts gradient components from a particular voxel having a plurality of fields.

6. The pipeline of claim 1 wherein a gradient interpolator using a gradient buffer operates in parallel with a RGBα interpolator using a RGBα buffer.

7. The pipeline of claim 1 wherein the first, second, and third multiplexers bypass a particular stage of the pipeline.

8. The pipeline of claim 1 further comprising:
    a memory, connected to a first stage and last stage of the pipeline, the memory storing the volume data set before and after processing by the pipeline.

9. The pipeline of claim 1 wherein the memory stores a rendered image.

10. The pipeline of claim 1 wherein the volume data set includes a plurality of voxels, each voxel including plurality of fields.

11. The pipeline of claim 10 wherein each field has an associated offset and a width in the voxel.

12. The pipeline of claim 10 wherein a particular field stores a volume category.

13. The pipeline of claim 10 wherein each field is interpolated according to different associated interpolation function.

* * * * *